United States Patent [19]

Clarke et al.

[11] 4,424,575

[45] Jan. 3, 1984

[54] TEXT PROCESSING SYSTEM INCLUDING MEANS TO ASSOCIATE COMMENTARY WITH TEXT

[75] Inventors: Samuel L. H. Clarke; Robert W. Inder, both of Chelmsford, England

[73] Assignee: The Marconi Company Limited, Chelmsford, England

[21] Appl. No.: 309,256

[22] Filed: Oct. 7, 1981

[30] Foreign Application Priority Data

Oct. 7, 1980 [GB] United Kingdom ............... 8032206

[51] Int. Cl.³ .......................... G06F 3/06; G06F 3/16
[52] U.S. Cl. .................................................. 364/900
[58] Field of Search ................................... 360/27; 364/900 MS File; 369/20, 24, 25, 27

[56] References Cited

U.S. PATENT DOCUMENTS

3,648,249  3/1972  Goldsberry .................. 364/900

Primary Examiner—Thomas M. Heckler
Attorney, Agent, or Firm—McDougall, Hersh & Scott

[57] ABSTRACT

A text processing system includes a word processor having a microprocessor controller interfacing a display unit, keyboard and memory. The word processor, in turn, is connected to a tape recording device via an interface unit permitting bi-directional transfer of data between the microprocessor and the recorder. During a first operating mode, designated text on the screen of the word processor has operator comments associated therewith which comments are recorded on the tape recorder along with address information for recovering the designated text from the word processor memory. In a second mode, comments are played back while viewing the text to which the comments pertain.

12 Claims, 6 Drawing Figures

TEXT PROCESSING SYSTEM INCLUDING MEANS TO ASSOCIATE COMMENTARY WITH TEXT

This invention concerns word-processor systems, and relates in particular to the use in such systems of methods and apparatus enabling the annotation of the text with comments.

It has long been common office practice for written documents to be prepared in draft form, the draft being considered, and if necessary amended, before being prepared in final form. The text—the word content—of the document is decided by the originator of the document, while the actual physical operation of preparing the document (by typing, say) is usually effected by a person skilled in the relevant art (of typing). Thus: a letter is dictated by the originator (who is not skilled in typing) to a secretary (who is); the secretary types the letter in draft form and returns it to the originator for "checking"; any necessary amendments are effected; and the letter is typed again in its final form.

While instructions regarding any changes can be written upon the draft itself, nevertheless, because it is often convenient to prepare the draft as though it were in the final form (so that, if there are no changes, it is in fact in its final form, and may be used as such), it is considered good practice for the originator checking the draft to write his comments not upon the draft but instead upon a separate paper associated with the draft, each comment including information identifying the portion of the draft's text to which it refers. The typist can then go through the draft checking it against the comments, or go through the comments checking them against the draft, so as to identify, and effect, the necessary text changes, and thus produce the document in its final form.

Although the equipment and procedures in the modern office may differ from the system just described, the concepts remain the same.

In the modern office increasing use is being made of word-processors—that is to say, word/text writing devices akin to the typewriter but operated in conjunction with a microcomputer (a microprocessor) so that the data (the text) input to the device may be stored in convenient (usually digital) form, manipulated as required, and then displayed in any suitable way (typically using a television-type screen commonly referred to as a Visual Display Unit, or VDU). It may often be the case that text originating from a first person (the originator) but prepared by a second person (a secretary, say) using a word-processor is to be considered and commented upon (perhaps by way of amendment) by the originator in much the same way as a draft typewritten document conventionally prepared by a typist is to be checked by the originator, but that the text is most conveniently presented to the originator using a VDU instead of in the form of "hard copy" on paper. Additionally, it may well be the case that the originator is unfamiliar with the VDU equipment and/or the skills necessary to use that equipment to give effect to his comments (to amend the text, say) or that his VDU is itself not equipped for effecting his wishes. The invention seeks to provide an arrangement whereby the text originator may append comments to the "draft" text displayed on the VDU, in a manner akin to putting the comments on an associated piece of paper, together with information identifying the portion of text to which the comments apply, but in a way more befitting the technology employed in word-processors and the modern automated office.

In one aspect, therefore, the invention provides, for use in a word-processor system, a method of supplying the text in a form wherein it is annotated with comments, in which method:

using recording means operable under the control both of the word-processor and of the commentator, information identifying the relevant portion of text currently displayed is caused by the word-processor to be recorded, and the required comments are caused by the commentator to be recorded in association with the text-identifying information;

and thereafter the word-processor is operated to display the text, and the recording means is operated to play back the comments, the text-identifying information associated with each comment being used by the word-processor to select the appropriate combination of text for display and commments for play-back.

In another aspect the invention provides, for use in a word-processor system, apparatus for supplying the text in a form wherein it is annotated with comments, which apparatus includes:

recording means operable under the control both of the word-processor and of the commentator;

means enabling the word-processor to cause the recording means to record information identifying the relevant portion of text currently displayed;

means enabling the commentator to cause the recording means to record the required comments in association with the text-identifying information;

and means whereby the word-processor may be operated to display the text, and the recording means may be operated to play back the comments, such that the text-identifying information associated with each comment is used by the word-processor to select the appropriate combination of text for display and comments for play-back.

Although in general the expression "word-processor" where used herein has its normal significance, it should be appreciated that "text" need not be purely words but could be any form of visible data—such as lists or arrays of numbers, or pictures—capable of being stored (commonly in digital form), displayed and manipulated by the system. Similarly, the "comments" with which the commentator annotates the text may take any data form and physical form that can be recorded and played back by the recording means, though—as discussed further hereinafter—it is envisaged that the most useful physical form of comments will be speech recorded in conventional analogue fashion. Thus, for "word-processor system" one can read "computer-driven data processing and display system," and thereafter for "word-processor" one can read "computer," and for "text" one can read "data." Nevertheless, the invention is intended primarily for use in the annotation of text in true word-processor systems, and is so described hereinafter.

The invention employs recording means operating under the control both of the word-processor and of the commentator. It is a primary objective of the invention that it should be useable with present-day word-processing equipment, and at no great additional cost, and therefore, while the recording means could be an integral part of the word-processor, it is most conveniently physically separate therefrom (though operatively connected thereto by some suitable interface and/or connection means). For the same reasons of convenience and cost, the recording means itself is most advantageously quite conventional in nature, and is preferably a magnetic tape or disc recorder—for example, a standard office dictating machine or one of those tape recorders known as cassette recorders (as opposed to the reel-to-reel type)—with, or modified so as to have, control means whereby the operation of the device may be controlled by the word-processor under the overall control of the commentator. A standard type of tape recorder usually has a microphone input, a remote switch input (controlling the driver motor), an auxilliary input, and an earphone output; with the addition of a suitable interface junction box and switch gear (as described hereinafter), such a recorder is quite acceptable.

The recording means is operable, under the control of the word-processor (or, more accurately, of the program controlling the word-processor). This control of the recording means takes two forms. Firstly, the word-processor needs to be able to turn the recording means on and off (to start and stop the drive motor of a tape recorder, say), and secondly the word-processor needs to be able to cause there to be recorded the desired text-identifying information. It will be seen that these requirements can easily be met when employing a conventional tape recorder; the remote switch input can be connected to the word-processor for turning on or off the recorder, while the signal input may be connected to the word-processor for supplying the text-identifying information.

The recording means is also operable under the control of the commentator (the person making the comments). Again, this control takes the two forms—turning on and off the recording means, either in record or playback mode, as appropriate, and recording the desired comments—and again it will easily be appreciated that the requirements can very conveniently be met using the remote switch input and the microphone input of a conventional tape recorder.

Because both the word-processor and the commentator need to control the operation of the recording means it is convenient if the controlling means—the various switches and connections—are appropriately interlinked. Indeed, it is most preferred if the on/off control of the recording means by the commentator is effected through the word-processor—and an advantageous way of achieving this is to arrange that the on/off control exercised by the commentator does not directly turn on (or off) the recording means but instead constitutes a signal to the word-processor to turn on (or off) the recording means. Thus, when the commentator is ready to record a comment he moves to "on" his recording means on/off switch, and this "instructs" the word-processor to turn on the recording means (and perhaps then generate and output to the recording means the necessary text-identifying information). Similarly, after the commentator has recorded his comment he moves his switch to "off," and this "instructs" the word-processor to turn off the recording means.

The word-processor causes there to be recorded information identifying the relevant portion of text currently being displayed, this information being used by the word-processor during playback to select the combination of that particular portion of text for display together with the comments recorded by the recording means in association with this information. The text-identifying information can take a number of different forms (provided, of course, they are all readable by the word-processor). Thus, for example, the information could itself directly identify the text portion, or alternatively the information could indirectly identify the text portion, by directly or indirectly identifying a processor memory location in which is stored the actual text portion identification. Illustrating this, direct identification is achieved by the information being a processor-readable representation of a text page and/or line number, while indirect identification is attained by the information being a simple marker pulse (these being counted to achieve identification of the corresponding portion of text) or preferably a processor-readable representation of a code number (the sequential number of the associated comment, say), this code number identifying the whereabouts of a memory location containing the current page and/or line number and/or cursor position relevant to the text in question.

It is desirable if, when the word-processor is actually recording the text-identifying information, the commentator be made aware of this fact, so that he know that the system is operating and that he should not begin speaking until it is ready to record his comment. This can be achieved by arranging for the word-processor to provide a "speak-after-this" tone while it is recording the information, and it is convenient if the information itself, appropriately modulated for recordal, is employed as the tone.

The relevant portion of text being identified may be as large or as small, as general or as specific, as required. For example, the text-identifying information could merely identify the whole of the text occupying the "page" being displayed (this "page" preferably being an updated version of the original page, taking account of any previous changes to the text), but where appropriate it advantageously identifies the text more specifically—thus, by line or, ideally, by the relevant word or letter. The choice of which text portion is so identified can be determined, for example, by the position of some form of pointer moveable about the display under the control of the commentator. With a conventional VDU displaying alphanumeric data, for instance, a light pen can be pointed at the screen, or the cursor can be moved around the screen, to mark individual characters (and thus the "words" containing the characters, and the lines containing the words), and the text-identifying information can then ultimately define not merely the "page" of text currently containing the marked portion but also the position of the cursor on the VDU, so pointing to the very word that needs correction.

The generation of the text-identifying information may be effected in any way appropriate, and conveniently it will be an entirely automatic process (controlled by the word-processor—or its program), in which the commentator need take no part. Thus, with a typical VDU display system, for example, the word-processor constantly maintains up-to-date identification of the displayed page and the position of the cursor on the screen, and is ready to output this at any time—and the time chosen may be whatever time is convenient to the commentator. It may, for example, be when he is ready to record a comment, or it may be after he has finished recording the previous comment. In either case the commentator may indicate the chosen moment by operating a switch on the word-processor dedicated to that purpose, but most conveniently (and using the preferred control interlink arrangement discussed hereinbefore) he does so simply by switching on (or off, as appropriate) his recording means remote switch, so instructing the word-processor both to turn on (or off) the recording means and to record thereon the necessary text-identifying information (if the latter is an indirect identification, then it may conveniently be recorded at the end of the previous comment, before the recording means is actually switched off).

The text-identification information is recorded on the recording means in association with the related comments. In addition it may be desirable to mark the text itself to show the relevant portion thereof, and in one preferred embodiment a suitable marker is placed thereon so that as the text is displayed there can be seen which portions thereof have recorded comments associated with them.

When playing back the recorded comments in association with a display of the relevant text portions, the system of the invention may be utilised in two distinct ways. In the first way, the text may be displayed page by page (or marked portion by marked portion), the word-processor then searching through the recorded text-identification information to find that relevant to the currently displayed text portion, and thus to find the comments associated therewith. However, though in theory this is attractive, and might indeed be preferred from an operator point of view, nevertheless, because of the problems arising from the difficulties of arranging the preferred cassette recorder or dictating machine to be controlled both as regards record and playback and as regards fast forward and fast rewind, and because of the delay inherent in any serial access device like a tape recorder, it is very much preferred to play back the record (the tape cassette, say), and have the word-processor then use the text-identifying information to identify, locate and display the relevant text portions before continuing to play back the associated comments. This latter way is very much the better having regard to the properties of standard tape recorders (or dictating machines) and typical word-processors, and for such an embodiment of the invention is therefore to be preferred.

Whichever of these two playback modes is used it is desirable that the displayed text be marked to show the particular portion of text relating to the recordal comment presently selected (and that this marking should be quite separate from any marking used simply to indicate which text portions have related comments). The marking may be effected in any convenient way, and where the text is displayed on a VDU examples are the position of the cursor or the use of reverse video or "bright-up."

An embodiment of the invention is now described, though only by way of illustration, with reference to the accompanying drawings in which.

DETAILED DESCRIPTION

Figure 1:
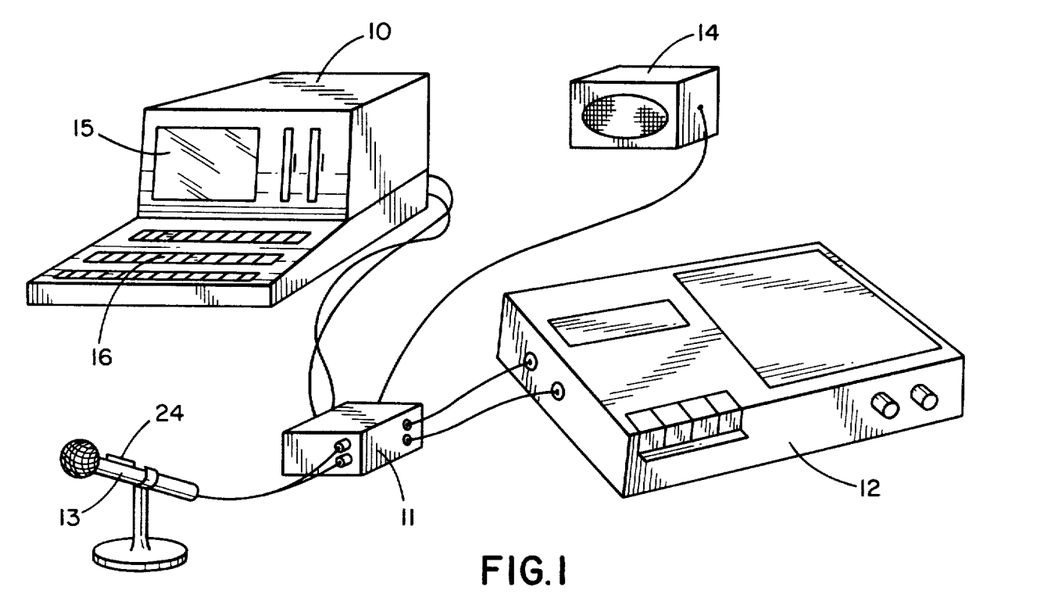
FIG. 1 shows in perspective view the main components of the apparatus used in the invention.

The apparatus of the Figures is a combination of a word processor (10), with its on-board computer (20 in FIG. 2) running under the control of an interactive program, a small amount of interfacing equipment (11), a standard office cassette tape dictating machine (12) having input and output sockets and a remote control (21, 22 and 23 in FIG. 2) for recording and reproducing speech and other analogue information, and hence suitably encoded digital information, a microphone (13), and a speaker (14—which may be in the form of earphones). The recorder 12 is operated via the computer 20, and is able to respond fairly quickly to "start" and "stop" commands from the computer.

Figure 3:
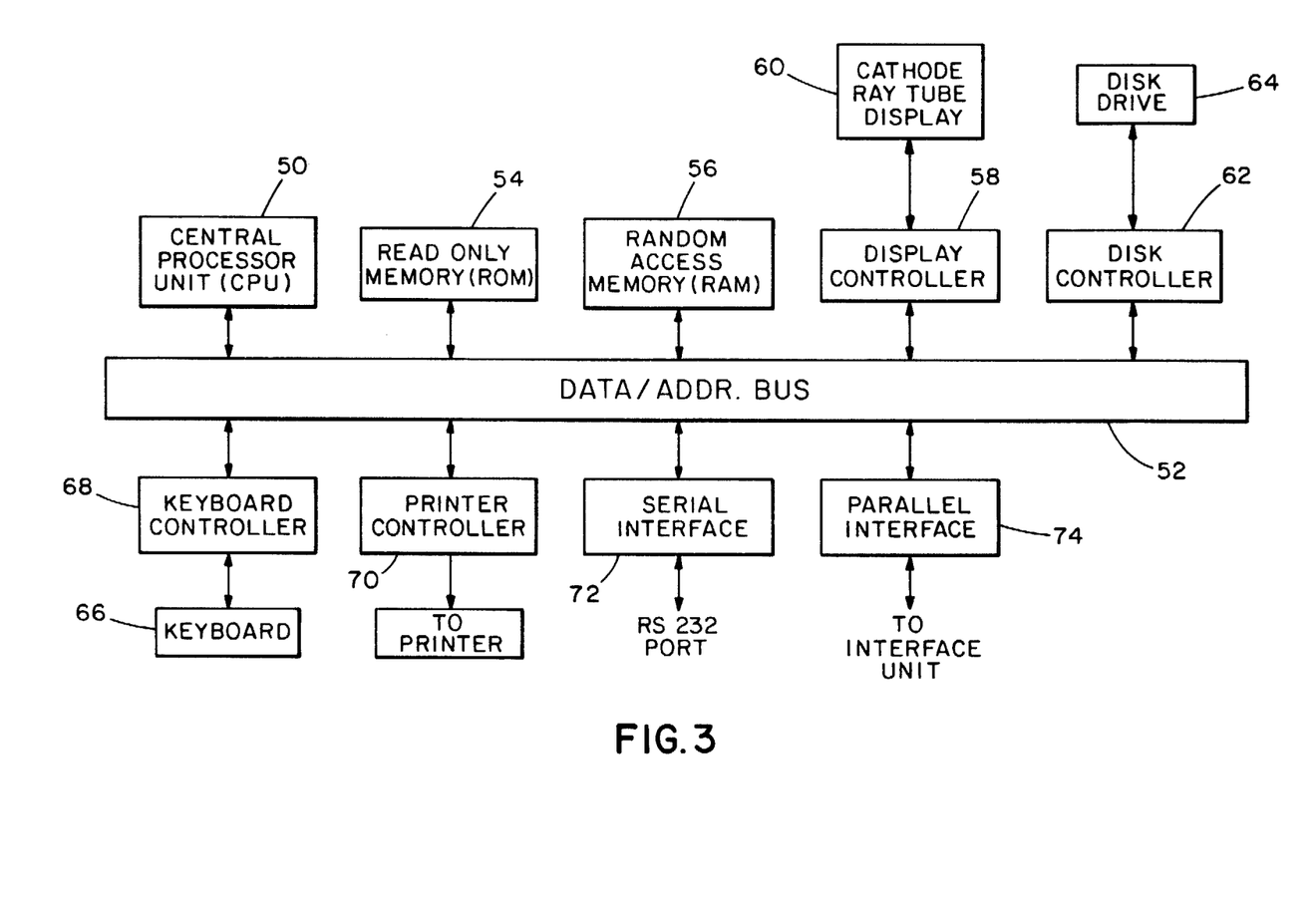
FIG. 3 is a generalized block diagram of a word processing unit suitable for use with the present invention.

Referring to FIG. 3, the generalized block diagram of the word processor 10 is illustrated. It must be understood that different word processors will have different arrangements but, for the purpose of understanding the present invention, it will be apparent to those skilled in the art that the elements shown in FIG. 3 are present and will function in the manner now to be described.

The central processing unit 50 is connected to the various memories, controllers, interfaces and input/output devices via a data and address bus 52. In particular, a read only memory (ROM) 54 and a random access memory (RAM) 56 are provided. The ROM contains the operating system software for operating both the word processor and the word processing system of the present invention as will be described in more detail in connection with FIGS. 4 and 5. A display controller 58 is responsible for controlling what appears on the cathode ray tube or video display unit (VDU) 60. Similarly, a disk controller 62 permits communication between the central processing unit and a disk drive unit 64.

Operator inputs to the system are accomplished via the usual word processor keyboard 66 and keyboard controller 68. A printer (not shown) is interfaced to the system via the printer controller 70. In the usual word processing system there will be provided one or more general purpose interfaces, such as the serial interface 72 and the parallel interface 74. According to the preferred embodiment of the invention, the word processor will be interfaced to the invention via the parallel interface 74 which is connected directly to the bus 52.

In the usual word processor the information displayed on the VDU is mapped, element for element, in selected RAM locations either in the random access memory 56 or the RAM located in the display controller 68. In either case, there is also stored in the RAM 56, address information pertaining to the displayed text. To implement the ability to comment on specific words or lines of displayed text, this address information is utilized and thus the address information for the cursor or other text designator is available to identify the text to which the comment pertains.

Figure 2:
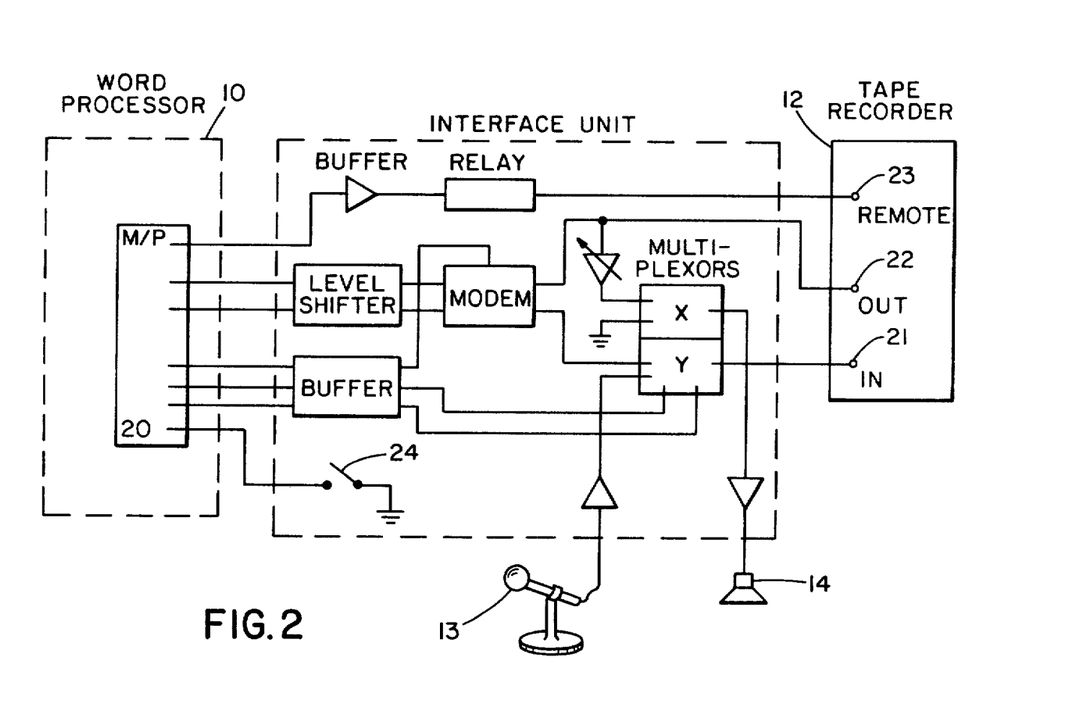
FIG. 2 is a simplified block diagram of the system according to the invention.
Figure 2A:
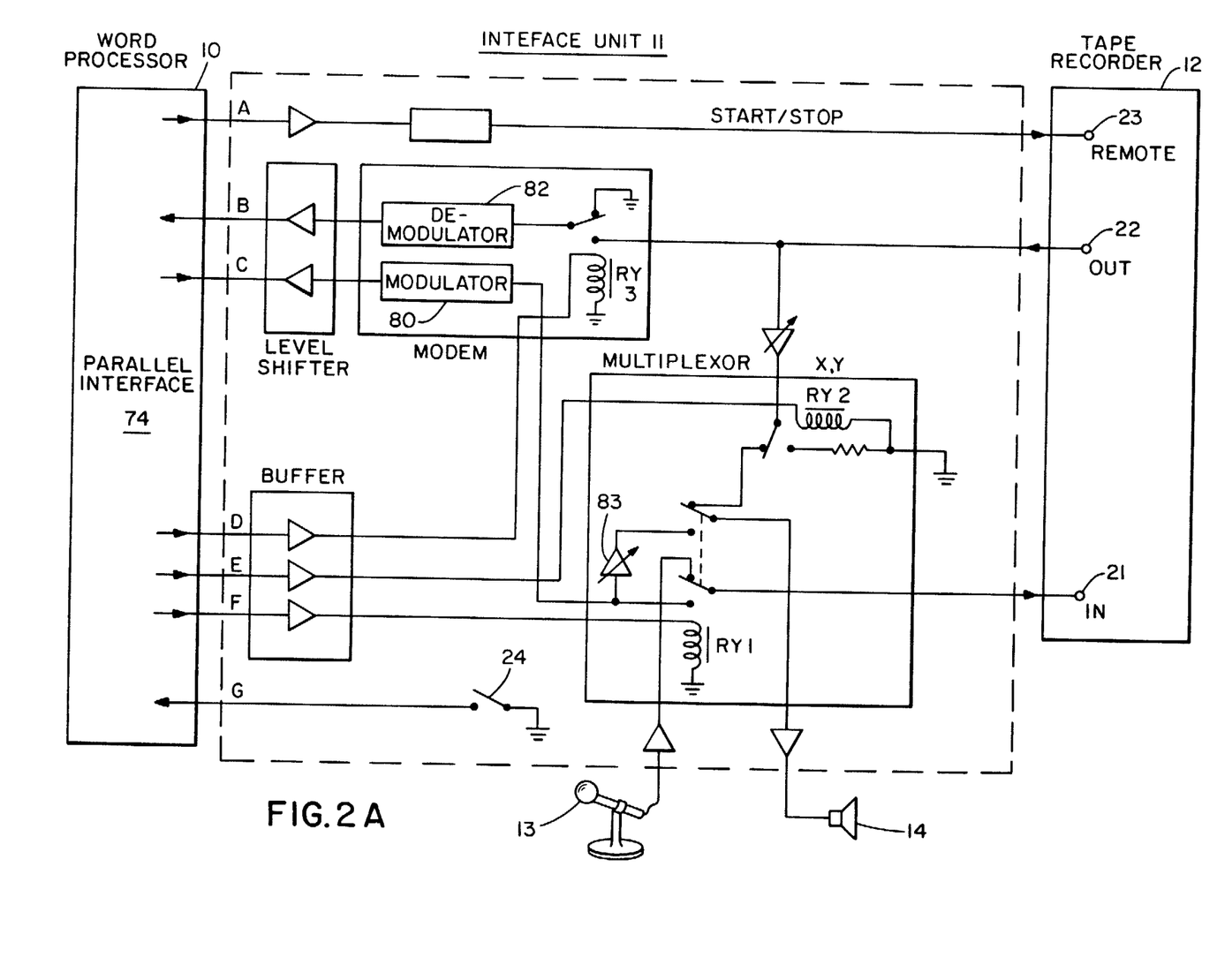
FIG. 2A is a schematic diagram of an interface unit suitable for use with the invention.

With reference to FIG. 2A, the manner in which the word processor is interfaced to the audio recording device 12 will now be described. The parallel interface 74 from the word processor shown in FIG. 3 has at least seven I/O lines which are interconnected through the interface unit 11 to the tape recorder 12. The seven lines have been identified by the letters A through G in the drawings and the function of each line will now be specified.

Line A is an output line from the word processor to the remote input 23 on the tape recorder. Control of this line, via an intermediate buffer and relay, permits the tape recorder motor to be started and stopped.

Lines B and C are inputs and outputs, respectively, to the word processor. On line C the address information from the RAM (e.g., RAM 56) is provided to a modulator 80 which, in turn, provides the signal to record input 21 of the recorder 12.

Line B is active only during the edit mode. Specifically, the address information is recorded on the tape and is supplied to a demodulator 82 restoring the address information to a digital format for processing by the processing unit 50. This path is controlled by relay RY3 and the associated contacts as illustrated in the drawing.

Line C is active only during a portion of the annotate mode and the modulator 80 is connected to the input 21 via a relay RY1 and the associated contacts.

Line D controls relay RY3. It prevents audio information from reaching the demodulator 82 and perhaps causing erroneous information to be processed by the CPU.

Line E controls a relay RY2 and associated contacts to disconnect the speaker 14 from the output 22 of the recorder during the time that the digital information is being played back through the demodulator 82 to obtain the necessary address information. This avoids an annoying tone being generated by speaker 14 during this interval.

Line F controls the position of relay RY1 contacts to selectively connect either the microphone or the output of modulator 80 to the input 21 of the tape recorder. Relay RY1, via the ganged contacts, and the volume control 83 communicates the output of the modulator 80 to the speaker 14 to produce the "speak-after-this" tone. Line G is an input to the interface 74 indicative of the position of the microphone switch 24.

The operation of the system falls clearly into two phases—annotation and edit.

Annotation

The user interacts with the word processor's computer by means of the visual display unit (VDU) and the word processor's keyboard. In this way he indicates the portion of text or other information he wishes to annotate. He then instructs the CPU to make a note of that text portion by operating the switch 24. The computer 20 then activates the recorder 12, and immediately records on it a unique burst of address information identifying the selected portion of the text presently being displayed. The information is appropriately recorded on the medium used—a modem (modulator/demodulator) operating at 1070 and 1270 Hertz is suitable for a cassette tape. After recording the identifying address information, the CPU connects the microphone 13 to the recorder 12, and the user's speech comment (or other analogue information) is then recorded in the normal way.

The user can, of course, employ the recorder's conventional controls to play back his own comments (to check, for example, that he has dealt fully with the particular matter to which any comment relates).

From the foregoing description of the annotation mode it will be apparent to those skilled in the art the manner in which the invention operates and the role of the microprocessor in facilitating such operation. In order to insure a complete disclosure of the invention, however, we will now describe, with reference to FIG. 4, a flow diagram of the system operation in the annotation mode.

Figure 4:
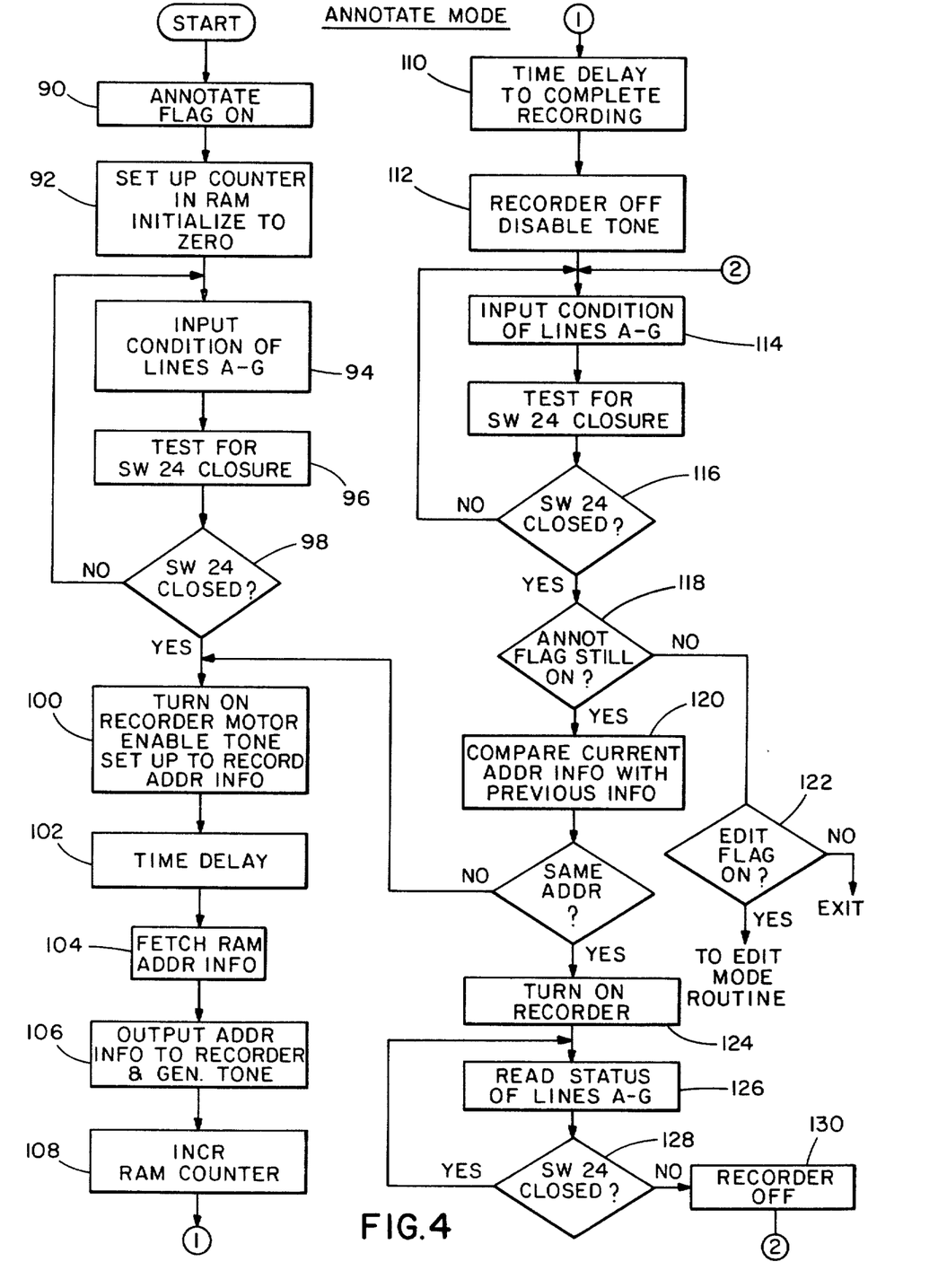
FIG. 4 is a flow diagram of the annotate mode of operation.

The flow diagram of FIG. 4 represents a sequence of logical steps which are performed by the CPU 50. The flow diagram is implemented as a computer program stored in the computer memory. A specific computer program will differ from system to system depending upon a number of variables, such as the type of microprocessor employed, the system configuration, the type of memory selected and other variables. The flow diagram, however, will permit easy implementation of the invention.

Referring to FIG. 4, the annotation mode is initiated by the user giving a command via the keyboard 66 (FIG. 3) indicating to the word processor that this mode is desired. The command causes the CPU to set the annotate flag 90 in a register or memory location. Next the software will set up a counter in the RAM memory and initialize the counter to zero as indicated at 92. The CPU then inputs the condition of the various lines A through G via the parallel interface 74 and tests to determine whether the switch 24 is open or closed as indicated at 94 and 96. In the event the switch is not closed a wait loop is entered monitoring the switch until it is closed indicating the beginning of the annotate sequence (98).

When the switch is closed the CPU outputs a command on line A to turn on the tape recorder 12 and line F to connect the output of modulator 80 to the input 21 of the tape recorder (100). After a time delay (102) to permit the tape recorder to reach proper speed the CPU fetches (104) from the RAM the necessary address information which correlates with the text currently displayed and to which the annotation will refer.

Specifically, the annotation can refer to the entire page or to a particular line of text or word or character or groups thereof. The specific subject of the annotation can be indicated by highlighting, reverse video, cursor position or other well known designator techniques. The address information fetched, therefore, will be a function of the manner in which the text is identified for annotation. Thus, if a whole page is referenced, the address information fetched will relate merely to the page. If a particular line is the subject of annotation, the address information will relate to the page and line number.

As indicated earlier in this specification, either directed or indirect addressing can be utilized. In the case of direct addressing, the address information would consist of the address for the text to be annotated and this would be stored on the recording tape. In that case the counter initialized in box 92 would not be utilized. In the case of indirect addressing, a unique number, as determined by the counter in box 92, would be recorded on the tape and used in a pointer or look up scheme to locate the correct address for the text being annotated.

Next the address information is outputted (106) via line C and the modulator 80 to the input 21 of the recorder. Simultaneously this information is used to generate the "speak-after-this" tone. The RAM counter is incremented (108) and a delay loop (110) executed to permit completion of the recording of the address information. The CPU then turns the recorder off (112) via line A and disconnects the speaker 14 from the modulator 80.

Next, the CPU again inputs the condition of lines A through G (114) and sits in a loop until switch 24 is closed (116). If the operator has not left the annotate mode, as indicated at 118, the CPU determines if the present text to be annotated is the same as the previous text (120). If the status has changed from annotate to edit the program exits to the edit subroutine shown in FIG. 5 (122).

If the text to be annotated is unchanged, the CPU enables the switch 24 to control operation of recording audio information by the tape recorder 12 via the mike 13. This is indicated in blocks 124 through 130. If the text to be annotated has changed, the program returns to the sequence indicated at 100 to cause new address information to be outputted from the word processor and stored on the tape as previously described.

Edit

During the edit mode the tape is played back to supply a first burst of address information. The CPU employs that information to retrieve the text to which the subsequent comment refers. The text is then displayed and the recorded comment is re-played to the user by the recorder 12. Thus, the user now hears through the speaker (or earphones) 14 what the annotator said while looking at the text portion about which he said it.

When the CPU 20, which is all the while monitoring the signal from the recorder 12, detects the next burst of address information, it suppresses the output of the speaker (or earphones) 14, reads the identifying information (so enabling it subsequently to locate and display the next corresponding portion of text), and then stops the recorder 12. It then waits for the user to indicate readiness to have the next comment replayed (which will normally be after the user has effected the editorial changes to the text necessitated by the previous comment) and then the cycle repeats.

If necessary, the user can of course employ the recorder's conventional controls to replay any particular comments. Naturally, so doing may cause the text identifying information relating to that comment to be read again, the computer then re-selecting the appropriate text for display.

In connection with the annotation phase, a flow chart (FIG. 4) was described illustrating the manner in which the invention operates to produce the desired results. We will now describe, in connection with FIG. 5, the manner in which the invention operates during the edit mode to essentially reverse the process and provide the operator (in this case usually a typist) with the benefit of the annotations so that the text may be revised accordingly.

Figure 5:
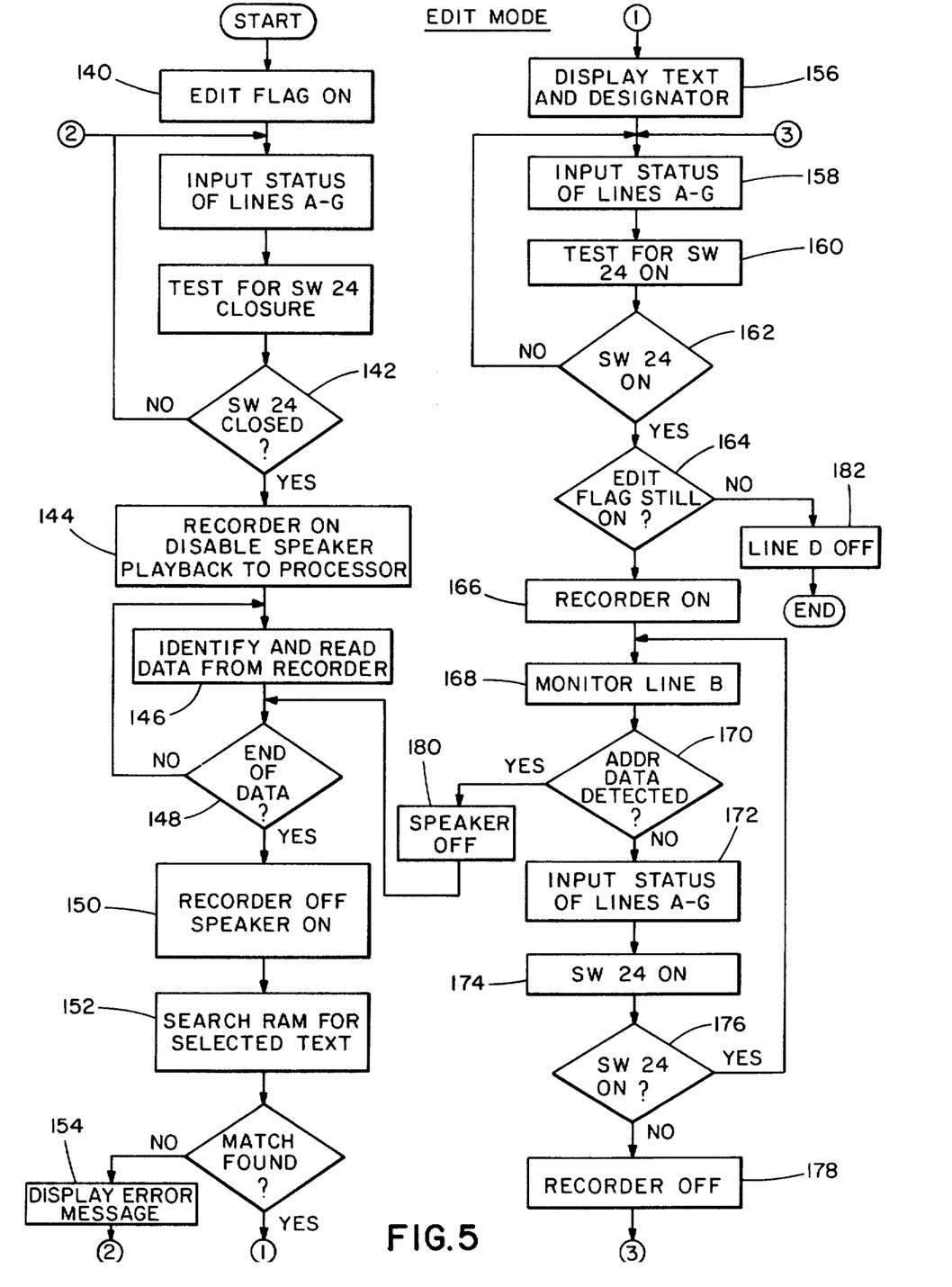
FIG. 5 is a flow diagram of the edit mode of operation.

Referring to FIG. 5, the operator initiates the edit mode via the keyboard 66 which, in turn, sets the edit flag 140. The status of lines A through G is read by the CPU, and if switch 24 is on (142), the tape recorder is turned on. The operator will have placed the recorder in the playback mode by manually operating the necessary buttons associated with the recorder. The output 22 of the tape recorder is provided via the demodulator 82 to the interface 74 and the speaker is disconnected to avoid noise (144).

Next the CPU tests for digital data from the demodulator 82 and reads the data when received and then tests to determine the end of the digital data, as indicated at 146 and 148. The tape recorder is then turned off and the speaker is again connected to the output of the tape recorder (150). The CPU then uses the address information read in from the tape either directly or indirectly, as previously described, to match and display the text associated with the annotation (152). In the event that a match cannot be made, an error message is displayed (154). Otherwise, the relevant text is displayed and the cursor or other designator of the pertinent text is correctly positioned or activated (156).

At 158 through 162 lines A through G are again read and a loop is provided to determine if the switch 24 has been activated. If the edit mode flag is still set (164) and switch 24 is still on, the tape recorder is turned on (166) and the operator may now listen to the annotation. While the audio information is being played back via speaker 14 the CPU constantly checks the recorder output to detect the presence of digital address data which would signal the end of one annotation and the beginning of a new annotation (168 through 176). Until address data is detected this situation continues unless switch 24 is turned off (176) in which case the recorder is turned off (178).

When address data is detected at 170, the program branches back to 148 after the speaker is again inhibited to avoid the tone (180).

In the event that the operator wishes to leave the edit mode, this is detected at 164 and the output from the recorder is disconnected from the demodulator 82 at 182.

While the foregoing embodiment is preferred it will be recognized by those skilled in the art that certain elements of the invention may be implemented in different manners. For example, the relay implementation of FIG. 2A can be replaced by solid state switching techniques with satisfactory results. In addition, if desired, the recorder can be a unit integral with the interface and be controlled by the CPU insofar as the change between record and playback modes are concerned. This would eliminate the need for the user to manually switch the recorder. Also a different type of display unit could be employed as, for example, LED or liquid crystal line displays or flat panel displays.

While we have shown and described embodiments of this invention in some detail, it will be understood that this description and illustrations are offered merely by way of example, and that the invention is to be limited in scope only by the appended claims.

We claim:

1. A text processing system operable in two modes, in a first mode audio commentary is recorded and associated with selected portions of displayed text, in a second mode the commentary is played back while the text to which it pertains is recalled to a display, said system comprising:
    (a) a word processor including:
        (i) a display unit (DU) on which the text is displayed,
        (ii) addressable means for storing data including said text,
        (iii) input means for selecting the mode of operation,
        (iv) a processing unit responsive to said input means for communicating data, including text, between said storage means, the DU and said input means, said processing unit generating digital address information corresponding to the locations in said storing means where said selected text is located, said processing unit including bus means by which the display unit, storing means and interface means can communicate with the processing unit;
    (b) recorder means capable of recording and playing back address information and commentary;

(c) means for interfacing said processing unit with the recorder means to permit the processing unit to control recording and playback and to store and retrieve said address information from the recording means such that:
  (i) during the first mode the processing unit generates address information to be recorded along with the audio commentary and
  (ii) during the second mode the processing unit causes the recorder to play back the recorded address information and commentary, said processing unit retrieving said address information via said interfacing means and utilizing it to display the text to which the commentary pertains;
whereby a first user can select text displayed on the DU and record commentary relating thereto and, when desired, the same or a second user can listen to the recorded commentary while having the text to which it pertains displayed on the DU.

2. The system according to claim 1 wherein said display unit is a cathode ray tube.

3. The system according to claim 1 wherein said storing means includes random access memory.

4. The system according to claim 1 wherein said input means includes a matrix of switches commonly referred to as a keyboard.

5. The system according to claim 1 wherein said word processor includes means for permitting the user to designate portions of the text displayed on said DU as the selected portions of text to which the commentary pertains.

6. The system according to claim 1 wherein said interface means includes:
  (a) means, operable during said first mode, for modulating the digital address information for said selected text generated by said processing unit to convert it to analogue information;
  (b) means for providing said analogue information to said recorder means.

7. The system according to claim 6 wherein said interface means includes:
  (a) means, operable during said second mode, for demodulating the analogue address information played back by said recorder means to convert it back to digital address information;
  (b) means for providing the demodulated digital address information to said processing unit to permit retrieval and display of the selected text.

8. The system according to claim 6 further including a speaker, said providing means also providing said modulated address information to said speaker to produce a "speak-after-this" tone.

9. The system according to claim 6 wherein said modulating means produces an output signal of a first frequency if the digital data is a logical 1 and an output signal of a second frequency if the digital data is a logical 0, according to a modulating technique known as frequency shift keying.

10. An operator controlled system for processing text and associating operator comments therewith comprising:
  (a) storage means for storing data including data corresponding to text;
  (b) a display unit for displaying text;
  (c) operator input means for permitting an operator to designate a portion of the text to which said comments will pertain;
  (d) a controller for communicating data between the storage means, the display unit and the operator input means and for producing address information for the data in the storage means corresponding to the designated portion of displayed text;
  (e) means for generating the comments to be associated with the designated text;
  (f) recorder means for recording said address data and comments;
  (g) means for receiving the address information and comments from elements (d) and (e) and transmitting them to said recorder means,
whereby the recorder means records said address data in association with comments made by the operator.

11. An operator controlled system for displaying text and playing back recorded audio comments relative thereto comprising:
  (a) a storage means for storing data including data corresponding to text;
  (b) a display unit for displaying text thereon;
  (c) a controller for communicating data between the storage means and the display unit;
  (d) recorder means incuding playback means, having recorded thereon address information for selected data corresponding to text stored in said storage means and audio comments related to said selected text;
  (e) operator controlled means for causing said recorder to play back said address information and, said audio comments;
  (f) interface means for providing said address information to said controller;
  (g) said controller utilizing said address information to locate the data in the storage means corresponding to the selected text and communicating said data to the display unit to display said text for viewing by the operator and, subsequent to said display, causing playback of the operator's comments pertaining to the displayed text.

12. The system according to claim 11 further including means for designating the selected portion to which the comments refer when said text is displayed on the display unit.

* * * * *